United States Patent [19]

Gowan

[11] 4,408,833
[45] Oct. 11, 1983

[54] HOT PRESSED AND DIFFUSION BONDED LASER MIRROR HEAT EXCHANGER

[75] Inventor: John G. Gowan, London, England

[73] Assignee: The United States of America as represented by the Secretary of the Air Force, Washington, D.C.

[21] Appl. No.: 339,260

[22] Filed: Jan. 13, 1982

[51] Int. Cl.³ .......................... G02B 5/08; B22F 5/00; C22C 27/04; B32B 15/02
[52] U.S. Cl. ................................. 350/310; 350/320; 29/460; 264/1.2; 264/1.9; 264/332; 75/240; 419/18; 428/556
[58] Field of Search ...................... 350/310, 288, 320; 264/1.2, 1.9, 332, 62; 29/460; 75/240; 419/18; 428/566

[56] References Cited

U.S. PATENT DOCUMENTS

| | | | |
|---|---|---|---|
| 3,781,094 | 12/1973 | Griest | 350/310 |
| 3,884,558 | 5/1975 | Dunn et al. | 350/288 |
| 3,926,510 | 12/1975 | Locke et al. | 350/310 |
| 4,214,818 | 7/1980 | Choyke et al. | 350/310 |

Primary Examiner—Jon W. Henry
Attorney, Agent, or Firm—Donald J. Singer; Bobby D. Scearce

[57] ABSTRACT

An improved heat exchanger for high energy laser mirrors is provided which comprises one or more sections each hot pressed into a desired configuration to define coolant passageways, and subsequently stacked and joined by a suitable means such as diffusion bonding. A surface of one of the sections may either support a laser mirror faceplate or be finished to provide the desired laser mirror surface.

8 Claims, 2 Drawing Figures

HOT PRESSED AND DIFFUSION BONDED LASER MIRROR HEAT EXCHANGER

RIGHTS OF THE GOVERNMENT

The invention described herein may be manufactured and used by or for the Government of the United States for all governmental purposes without the payment of any royalty.

BACKGROUND OF THE INVENTION

This invention relates to improvements in laser mirrors, and more particularly to high energy laser mirrors having heat exchanger means for circulation of coolant fluid therethrough to prevent overheating of the mirror, and to methods for fabricating such mirrors.

Certain heat exchangers for high energy laser mirrors have conventionally been fabricated of molybdenum with joints and interfacing surfaces brazed with materials such as copper-gold alloy braze. For the heat exchanger assembly to exhibit the desired heat exchange properties, the heat exchanger components are characteristically thin walled, which often results in deformation of the mirror surface under the pressure of coolant flow through the heat exchanger. Further, molybdenum heat exchangers may suffer structural damage by the corrosive effects of the coolant, which conventionally is water.

Tungsten carbide heat exchangers fabricated in accordance with the present invention substantially eliminate, or reduce in critical importance, the foregoing problems associated with certain conventional heat exchangers, by exhibiting superior structural strength and corrosion resistance.

The present invention provides an improved heat exchanger configuration comprising an assembly of heat exchanger sections which may be easily fabricated in quantity by hot pressing techniques in reusable molds, may be further densified by isostatically pressing if required, and may be stacked and joined by diffusion bonding techniques. It might also be desirable to hot isostatically press the original shape in a non-reusable mold. The heat exchanger of this invention exhibits superior heat transfer properties, may be produced economically in quantity, and is highly resistant to deteriorating effects of exposure to high temperature.

It is, therefore, an object of the present invention to provide an improved heat exchanger for high energy laser mirrors.

It is another object of the present invention to provide an improved laser mirror heat exchanger which may be produced in quantity.

It is yet another object of the present invention to provide an improved laser mirror heat exchanger which is repairable or replaceable.

It is yet another object of this invention to provide a heat exchanger with no low temperature joints such as those found in brazed mirrors.

It is another object of this invention to provide a method for producing an improved high energy laser heat exchanger.

These and other objects of the present invention, as might occur to one with skill in the field of this invention, will become apparent as the detailed description of specific embodiments thereof proceeds.

SUMMARY OF THE INVENTION

In accordance with the foregoing principles and objects of the present invention, an improved heat exchanger for high energy laser mirrors is provided which comprises one or more sections each hot pressed into a desired configuration to define coolant passageways, and subsequently stacked and joined by a suitable means such as diffusion bonding. A surface of one of the sections may either support a laser mirror faceplate or be finished to provide the desired laser mirror surface.

DESCRIPTION OF THE DRAWINGS

The invention will be more clearly understood from the following detailed description of specific embodiments thereof read in conjunction with the accompanying drawings wherein.

DETAILED DESCRIPTION

Figure 1:
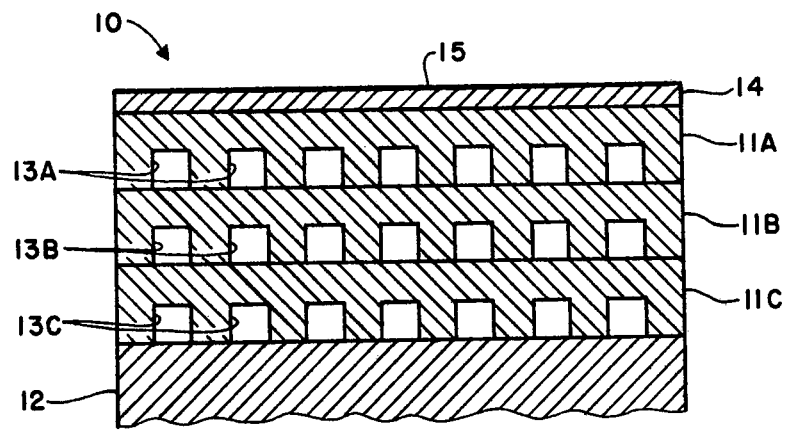
FIG. 1 is a schematic cross-sectional view of one embodiment of the present invention.
Figure 2:
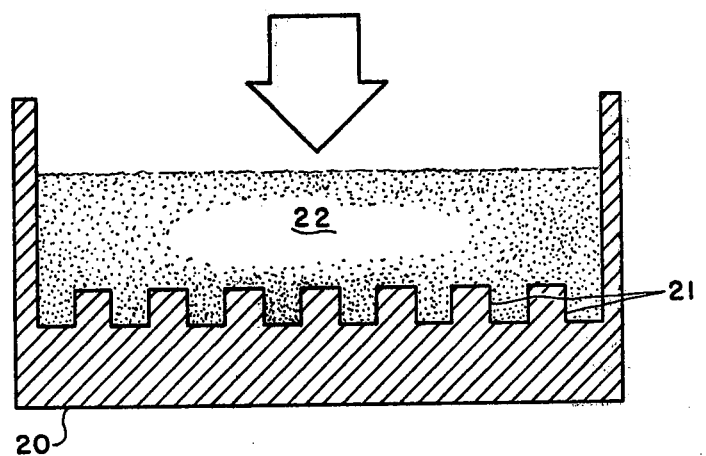
FIG. 2 is a schematic illustration of a representative pressing mold which may be used to produce a heat exchanger section of this invention.

Referring now to the accompanying drawings, FIG. 1 is a schematic elevational view in section of one embodiment of the novel heat exchanger of the present invention depicting a plurality of hot pressed heat exchanger sections assembled into a unified mirror structure. FIG. 2 is a schematic of a representative mold for pressing the heat exchanger sections shown in FIG. 1.

As shown in FIG. 1, the improved laser mirror 10 of the present invention, in one embodiment thereof, may comprise one or more hot pressed heat exchanger sections 11A, 11B, 11C in a stacked configuration substantially as shown in FIG. 1, and subsequently joined at their interfacing surfaces, into a unified structure, by suitable joining means, for example, by diffusion bonding. Pressed sections 11 may conveniently be composed of a pressed tungsten carbide-cobalt powder mixture and may be used in the construction of the novel laser mirror 10 of the present invention. The size of the pressed sections 11, and consequently of laser mirror 10, is not limiting of the scope of the invention herein. Sections 11 having diameters of up to about 60 cm may therefore be fabricated according to the present invention.

The assembly of one or more pressed sections 11 with supporting substructure 12 define a plurality of interconnecting passageways 13A, 13B, 13C to conduct coolant fluid, such as water, therethrough to cool laser mirror 10 during use. Suitable inlets, outlets and manifolds (not shown) may be provided to conduct coolant into and out of the passageways 13 of the individual pressed sections 11, and, in addition, means (also not shown) may be provided to interconnect the respective passageways 13 of a plurality of pressed sections 11. Passageways 13 may be of any convenient size consistent with pressed section fabrication and passageway coating procedures hereinafter described. Sections 11 defining passageways 13 of cross-section as small as about 0.5 mm to about 2.0 mm have been successfully fabricated and coated, although sections defining larger passageways are fully contemplated within the scope hereof.

Substructure backing plate 12 may be of any desirable configuration or material, consistent with the requirement to join, by, for example, diffusion bonding, with a pressed section, as section 11C, and to provide structural support. Substructure 12 may preferably be tungsten carbide, solid or cored for reduced weight, or hot isostatically pressed to a rigid lightweight structure.

The laser mirror faceplate 14 may be conventionally configured of a layer of tungsten chemically vapor deposited or sputtered onto pressed section 11A and subsequently polished to a mirror surface 15. Other materials for mirror faceplate 14 could be applied, including tungsten carbide or tungsten rhenium and are therefore not limiting hereunder. Alternatively, faceplate 14 may be configured as a separately fabricated structure and applied to the surface of pressed section 11A, although this option is less attractive because a very thin foil would normally be required to minimize the mirror surface to channel surface distance. The selection of materials for the pressed sections 11 may, in addition, allow the polishing of a mirror surface directly onto an exposed surface of pressed section 11A.

Pressed heat exchanger sections 11 may be fabricated using a mold such as the graphite mold 20 shown schematically in cross section in FIG. 2. Mold 20 is of the desired shape and size, having as a part thereof a plurality of suitably shaped and configured ribs 21 on the bottom thereof to provide channels in the pressed section corresponding to the desired shape of passageways 13 defined in the assembly depicted in FIG. 1.

A carefully refined powder 22 of the desired constituent carbide, such as tungsten carbide, and a binder, such as cobalt, are milled, screened and lubricated conventionally by suitable process. Care should be taken to maintain a small grain structure and the appropriate tungsten carbide-cobalt percentage compositions desired for the finished pressed sections 11. Pressed sections 11 composed of about 94 weight percent tungsten carbide particles and about 6 weight percent cobalt particles in the 1–2 micron particle size range had optimum physical and mechanical properties. It is highly desirable to obtain a pressed section 11 demonstrating a coefficient of thermal expansion of or slightly greater than $2.5 \times 10^{-6}$ in/in/°F. in order to be optimally compatible with a corrosion protective metal coating which may be applied to the walls defining passageways 13 as referred to hereinafter.

To fabricate a pressed section 11, powder 22 of the desired composition and predetermined quantity may be charged into mold 20 and hot pressed to shape. This should result in a small quantity of pores less than 10 microns in diameter. To further reduce the pore size and quantity, the part can be placed into a flexible container (not shown) which in turn is placed into a pressure vessel (not shown) which is then closed in preparation for pressing. The powder 22 is then pressed to about 42,700 psi and simultaneously heated to about 1600° C. to produce a substantially pore-free pressing in the desired shape of pressed section 11. Care must be taken not to allow grain size such that the distance between carbide particles exceeds 0.6 microns to prevent an unacceptable reduction in mechanical properties. These pressing parameters proved suitable to produce desirable pressed sections 11 of the above mentioned preferred tungsten carbide-cobalt composition. These parameters may vary, within the scope of the invention herein, depending on the selection of material composition for sections 11, as would occur to one with skill in the field hereof. The pressed sections 11 may then be suitably finished as by machining, lapping or polishing, if necessary or desirable, to provide interfacing surfaces of suitable quality for bonding together, as hereinabove discussed, to obtain the assembly shown in FIG. 1.

Laser mirror 10 in the assembled form shown in FIG. 1 may, during use, suffer deleteriously from corrosion of the pressed sections 11 by cooling water though the selective leaching by the cooling water of the cobalt from pressed section 11. To avoid this problem, it may be desirable to coat the internal surfaces of the walls defining passageways 13 with a suitable corrosion resistant metal coating of tungsten having suitable corrosion resistance and coefficient of thermal expansion compatible with that of the tungsten carbide-cobalt pressing. Use of a metal having a coefficient of thermal expansion closely approximating that of the pressed section 11 will provide the advantage of avoiding stress corrosion cracking of the coating. The coating for the walls may be applied to an assembly of pressed sections as shown in FIG. 1 by a chemical vapor deposition method as described in the copending application, assigned to the assignee hereof, and entitled "Corrosion Resistant Laser Mirror Heat Exchanger", Ser. No. 308,976, filed Oct. 6, 1981.

There is, therefore, described herein an improved high energy laser mirror, heat exchanger and method for fabricating same. It is understood that certain variations of process parameters and materials used in the invention as hereinabove described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

I claim:
1. A fluid cooled laser mirror structure which comprises:
 a. a heat exchanger defining a plurality of internal passageways for conducting fluid coolant therethrough, said heat exchanger comprising a hot pressed member of powdered tungsten carbide and a binder, said hot pressed member having on a first surface thereof a plurality of channels configured in a predetermined pattern, and a backing plate covering said first surface to define said passageways configured in said pattern;
 b. inlet and outlet means communicating with said passageways for conducting said fluid coolant into and out of said heat exchanger; and
 c. a mirrored surface supported by said member adjacent a second surface of said pressed member.

2. The laser mirror as recited in claim 1 wherein said binder comprises cobalt.

3. The laser mirror as recited in claim 2 wherein said member comprises hot pressed powder containing about 94 weight percent tungsten carbide powder and the remainder cobalt powder.

4. The laser mirror as recited in claim 3 wherein said member comprises said powder having a particle size range of from about one to about two microns.

5. A method of fabricating a fluid cooled laser mirror, including a heat exchanger defining a plurality of internal fluid conducting passageways therethrough, which comprises:
 a. hot pressing in a mold powdered tungsten carbide, including a binder, to form a pressed member having on a first surface thereof a plurality of channels configured in a predetermined pattern, and having a substantially even second surface opposite said first surface;

b. attaching a backing plate to said pressed member over said first surface thereof to provide an intermediate structure defining therethrough a plurality of passageways in said predetermined pattern; and c. applying a mirrored surface to said second surface of said pressed member.

6. The method as recited in claim 5 further comprising selecting powdered cobalt as said binder.

7. The method as recited in claim 6 wherein step a is characterized by hot pressing in said mold a powder containing about 94 weight percent tungsten carbide and the remainder cobalt powder.

8. The method as recited in claim 6 further comprising selecting tungsten carbide powder and cobalt powder having a particle size range of from about one to about two microns.

* * * * *